United States Patent Office 3,045,925
Patented July 24, 1962

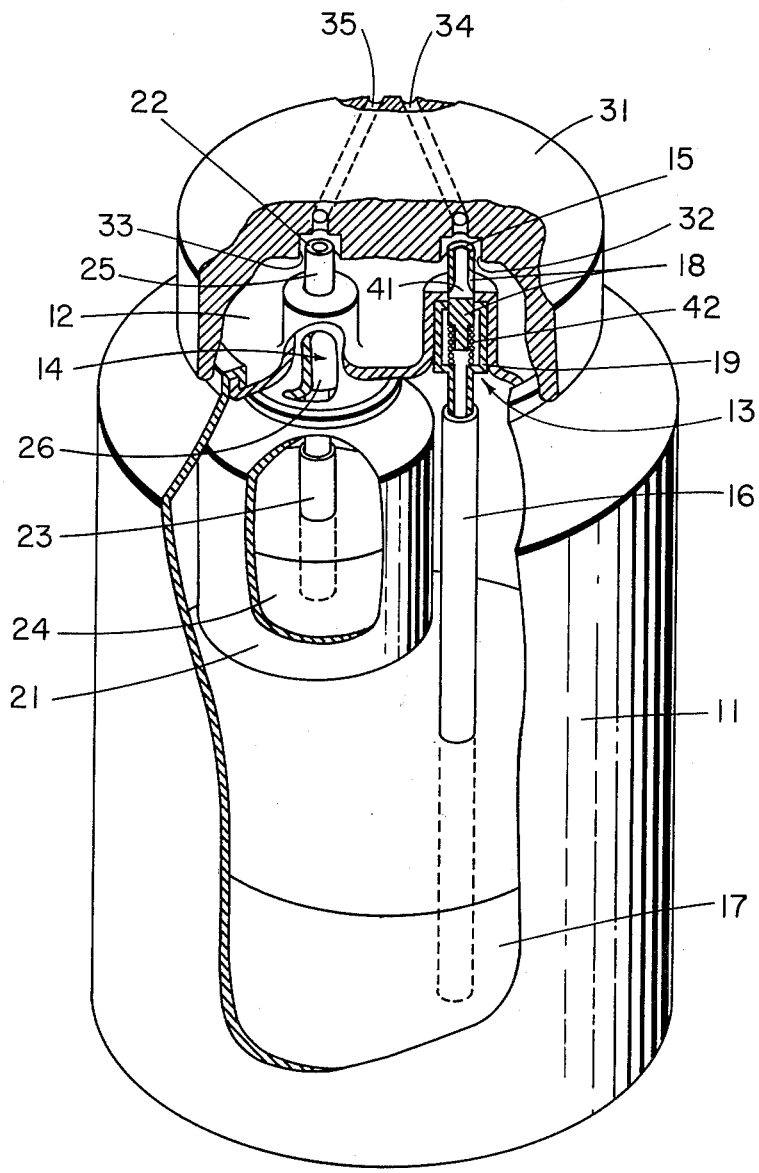

3,045,925
MULTIPLE SPRAY APPARATUS
Michael N. Giangualano, Los Angeles, Calif.
(1718 Chalet Ave., Anaheim, Calif.)
Filed Sept. 29, 1959, Ser. No. 843,246
1 Claim. (Cl. 239—306)

The present invention relates to spraying devices, and more particularly to spraying devices in which two or more separately contained fluids are mixed during the spraying process so as to form a single spray.

It is often desirable to spray various materials with polymer resins in order to obtain a protective coating able to deter corrosion and to prevent exposure to the atmosphere from shortening the life of the material. The process by which unsaturated liquid resin hardens into a solid protective polymer coat is called "polymerization" or "curing." One of the difficulties encountered in applying an unsaturated liquid resin to a surface to form a protective coat is controlling the rate of polymerization, or the amount of time required for curing, at room temperatures. A resin without any promoter or catalyst added to it has a long shelf or liquid life, which is very desirable from a marketing point of view; but if such a resin is applied to a surface, the rate of polymerization is prohibitively slow. If a chemical promoter is added to the resin, the rate of polymerization is increased, but not sufficiently. If, instead, a chemical catalyst is added to the resin, the rate of polymerization is increased even more, but is still too slow for practical applications. If both a chemical promoter and a chemical catalyst are added to a resin, the polymerization is sufficiently speeded up so that the curing occurs at ordinary room temperatures within one-half hour, a reasonable period of time. The problem in mixing the polymer, promoter, and catalyst together in one container is that rapid curing immediately begins thereupon, necessitating that the spraying of the material be begun promptly. Furthermore, all of the mixture that is not sprayed will harden and be wasted.

The method of spraying that is presently in use in the resin industry attempts to circumvent this problem by using two separate containers, one for a solution of a resin mixed with a promoter and the other container for a catalyst. Each container is connected by a separate tube to a different nozzle of an elaborate spray gun having two nozzles and connected to an electric motor-powered air compressor. When a trigger is pulled, each nozzle ejects a spray. The sprays are mixed to form a single spray that can be applied to the surface to be coated by the resin. Such a spray gun having two separate containers and the attendant tubing, electric compressor and nozzles is difficult to control, bulky, and expensive. Another disadvantage is that such a spray gun is not practical for small applications.

It is an object of the present invention, therefore, to provide a novel multiple spray apparatus.

It is another object of the present invention to provide, for spraying polymer resins, an apparatus that does not mix the chemical components until the spraying process is begun.

It is another object of the present invention to provide a spray apparatus that is inexpensive, not bulky, and practical for use in small applications of polymer resins.

According to the preferred embodiment of the present invention, a multiple spray apparatus comprises two containers, each having a valve in its top. Each valve is connected to a pressurized liquid in the bottom of its respective container. One container is smaller than the other, and the smaller one is placed within the larger one. The valve of the smaller container extends through the top of the larger container and is secured thereto. A cap covers both valves, and when the cap is pressed, the two valves are opened, thereby causing a spray or stream to be ejected from each container. The streams are mixed just externally to the cap to form the desired single spray.

The features of the present invention which are believed to be novel are set forth with particularity in the appended claim. The present invention, both as to its organizatoin and manner of operation, together with further objects and advantages thereof, may best be understood by reference to the following description, taken in connection with the accompanying drawing, in which:

The sole FIGURE is a cut-away isometric view of a spray apparatus according to the present invention.

Referring now to the drawing, the sole FIGURE shows can 11 having a top 12 for securely supporting valves 13 and 14 and sealing can 11. Valve 13 couples nozzle 15 to tubing 16, which is inserted in liquid 17 within can 11. Liquid 17 is a suspension of dichlorodifluoromethane propellant and an active ingredient such as either a polyester or epoxy resin mixed with a promoter such as dimethyl aniline or cobalt in a ratio of about 99 to 1. Valve 13 comprises movable member 18 and stationary member 19. Valve 14 is connected to can 21 within can 11. Valve 14 couples nozzle 22 to tubing 23, which is inserted in liquid 24 within can 21. Liquid 24 is a suspension of dichlorodifluoromethane propellant and a catalyst such as methyl ethyl ketone peroxide or benzoyl peroxide as the active ingredient. Valve 14 comprises movable member 25 and stationary member 26 and is similar in construction to valve 13.

Cap 31 fits snugly over top 12 and contains recesses 32 and 33 for receiving and mating with nozzles 15 and 22, respectively. Nozzle 15 cooperates with spout 34, one end of which opens into recess 32. Nozzle 22 cooperates with spout 35, one end of which opens into recess 33. Spouts 34 and 35 tunnel through cap 31 and terminate at different external openings that are close to each other. Spouts 34 and 35 are angularly positioned so that if they were extended beyond cap 31, their axes would intersect a short distance from cap 31.

The construction of cans 11 and 21 is similar to that of a common aerosol-type container that uses as a propellant a gas such as dichlorodifluoromethane, which is liquified either by cooling it below its boiling point or by compressing it at ordinary room temperatures. When the container is brought to or near room temperature, the liquid exerts considerable pressure upon the walls of the container, and the space above the liquid is filled by gas exerting the same pressure. When the valve is opened, the pressure forces some of the liquid up the tube and out the nozzle. The expelled liquid vaporizes because of the drop in pressure and some of the unexpelled liquid evaporates into the gas space to occupy the space left behind by the expelled liquid. The active ingredient, which is suspended or dissolved in the pressurized liquid, is carried out the nozzle and left behind when the pressurized liquid vaporizes.

Valves 13 and 14 are similar in construction and operation to the valves commonly used on the now widely sold aerosol-type containers above described. Valve 14 can be secured to the top of container 21 and the top of container 21 can then be secured to the top of the container 11, as shown in the sole FIGURE, or, if desired, valve 14 can be secured directly to the top of container 11, the same as is valve 13, and the top of container 21 can then be secured to the lower portion of valve 14.

When cap 31 is pressed down, the roofs of recesses 32 and 33 mate with nozzles 15 and 22, respectively, and force them downward. The movements of nozzles 15 and 22 are translated to movable members 18 and 25, respectively, which are integral therewith, and hence movable members 18 and 25 are forced downward within stationary members 19 and 26, respectively. Valves 13 and 14 are similar in construction and only one need be considered. When valve 13 is in its closed condition, liquid 17 cannot escape from stationary member 19. When movable member 18 is forced downward, liquid 17 can escape through canal 41, out nozzle 15, and into spout 34. When cap 31 is no longer pressed, spring 42, which is connected to the lower portion of movable member 18, forces movable member 18 to slide up, thereby closing the passageway between stationary member 19 and canal 41. Valves 13 and 14 are adjusted so that when cap 31 is pressed, liquids 17 and 24, respectively, are discharged into spouts 34 and 35, respectively, in a predetermined ratio. The ratio can also be controlled by selectively choosing the diameters of nozzles 15 and 22. The volume of the catalyst should be about 2% of the volume of the resin mixed with the promoter. Thus, the discharge of liquid 24 into spout 35 is considerably less in volume than the discharge of liquid 17 into spout 34. If it is desired to lessen this difference in volume somewhat, liquid 24 can comprise a mixture of catalyst with some resin, and liquid 17 can still comprise a mixture of promoter and resin.

The angular position of spouts 34 and 35 causes the streams or sprays discharged therefrom to mix just externally to cap 31 and form a single stream or spray that can be aimed at the material to be coated with the resin. It is important that the catalyst, promoter, and resin mix externally to cap 31. If mixed internally, they would harden in cap 31 and render it inoperative. In some applications of the spray apparatus of the present invention, such as a dental spray using polyurethane foam instead of a polyester resin, it is desirable to mix the two streams just at the external orifice of spouts 34 and 35, but then cap 31 should be detachable so that it can be washed to prevent clogging.

When the resin is to be applied in a thin layer to the surface to be coated, a surface-curing agent, such as paraffin wax, can be mixed in with liquid 17 to prevent surface air from causing an inadequate exothermic reaction, thereby preventing polymerization. The surface-curing agent accomplishes this by coming to the surface of the sprayed-on resin and forming a protective layer that prevents the air from coming in contact with the resin.

If desired, instead of the above-described aerosol-type container, a compressed gas can be used as the propellant. The disadvantage of using a compressed gas is that there is no reservoir of liquid to produce pressure, and, therefore, the pressure keeps dropping as the gas is expelled.

The spray apparatus of the present invention, although best suited for applications to small areas where it is necessary to use only a small amount of polymer, can also be used for applications to large areas.

While particular embodiments of the present invention have been shown and described, it will be obvious to those skilled in the art that changes and modifications may be made without departing from this invention in its broader aspects, and, therefore, the aim of the appended claim is to cover all such changes and modifications that fall within the true spirit and scope of this invention.

I claim:

Apparatus for spraying a freshly admixed composition including a polymerizable resin and a catalyst therefor, comprising:

(a) a first pressurized aerosol container for said resin, said container being rigid, portable, and cylindrical and having a closure plate sealed thereto in pressure-tight relation, (b) a normally spring-closed egress valve for said resin secured directly to said closure plate, (c) a second and smaller pressurized, rigid, and cylindrical aerosol container for said catalyst secured directly to said closure plate laterally of said valve and suspended solely from said plate within the confines of said first container, said second container being individual and separate from said first container so as to be capable of being pre-packaged and pre-pressurized with an aerosol propellant and said catalyst independently of said first container, (d) a second normally spring-closed egress valve for said catalyst, said second valve being secured to said second container and passing through said plate in the region where said second container is secured thereto, and (e) a movable cap element surmounting said egress valves and adapted to engage and simultaneously operate said valves, said cap having formations adapted to mate with the egress orifices of said valves and including fluid channels in communication with said respective formations, said channels converging toward closely-spaced respective exit openings at the outer surface of said cap so as to cause said resin and catalyst to be discharged from said cap in separate streams that mix in a region external to said cap.

References Cited in the file of this patent

UNITED STATES PATENTS

| | | |
|---|---|---|
| 692,722 | Seltzer | Feb. 4, 1902 |
| 1,094,761 | Thousand | Apr. 28, 1914 |
| 1,981,446 | Apfelbaum | Nov. 20, 1934 |
| 2,813,751 | Barrett | Nov. 19, 1957 |
| 2,876,935 | Lindberg | Mar. 10, 1959 |
| 2,941,696 | Homm | June 21, 1960 |
| 2,973,883 | Modderno | Mar. 7, 1961 |